US011137252B2

United States Patent
Blomqvist et al.

(10) Patent No.: US 11,137,252 B2
(45) Date of Patent: Oct. 5, 2021

(54) MULTIAXIS GYROSCOPE WITH SYNCHRONIZATION FRAME

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/747,681

(22) Filed: Jan. 21, 2020

(65) Prior Publication Data
US 2020/0263988 A1 Aug. 20, 2020

(30) Foreign Application Priority Data
Feb. 15, 2019 (FI) .................... 20195119

(51) Int. Cl.
*G01C 19/5712* (2012.01)
*G01C 19/5747* (2012.01)
*G01C 19/5684* (2012.01)
*G01C 19/5677* (2012.01)

(52) U.S. Cl.
CPC ..... *G01C 19/5712* (2013.01); *G01C 19/5677* (2013.01); *G01C 19/5684* (2013.01); *G01C 19/5747* (2013.01)

(58) Field of Classification Search
CPC ............ G01C 19/5747; G01C 19/5684; G01C 19/574; G01C 19/5712; G01C 19/5719; G01C 19/5642; G01C 19/5677
See application file for complete search history.

(56) References Cited

U.S. PATENT DOCUMENTS

| | | | | |
|---|---|---|---|---|
| 8,256,290 | B2* | 9/2012 | Mao ................. | G01C 19/5719 73/504.12 |
| 9,551,577 | B2* | 1/2017 | Ruohio ............. | B81B 3/0043 |
| 10,317,210 | B2* | 6/2019 | Kub .................. | G01C 19/5684 |
| 2007/0214883 | A1* | 9/2007 | Durante ............ | G01C 19/5712 73/504.04 |
| 2010/0294039 | A1 | 11/2010 | Geen | |
| 2012/0024056 | A1* | 2/2012 | Hammer ........... | G01C 19/5712 73/504.02 |
| 2012/0048017 | A1 | 3/2012 | Kempe | |
| 2013/0031977 | A1 | 2/2013 | Kempe | |

(Continued)

OTHER PUBLICATIONS

European Search Report dated Jun. 18, 2020 corresponding to European Patent Application No. 20154226.

(Continued)

*Primary Examiner* — Helen C Kwok
(74) *Attorney, Agent, or Firm* — Squire Patton Boggs (US) LLP

(57) ABSTRACT

This disclosure describes a microelectromechanical multi-axis gyroscope comprising a proof mass quartet, a central suspension arrangement for suspending the proof mass quartet from the central anchor point. The gyroscope also comprises a synchronization frame and a detection mass quartet. One or more lateral corner springs extends to each detection mass from the laterally adjacent proof mass, and one or more transversal corner springs extends to each detection mass from the transversally adjacent proof mass.

5 Claims, 14 Drawing Sheets

(56) References Cited

U.S. PATENT DOCUMENTS

| | | | |
|---|---|---|---|
| 2013/0167636 A1* | 7/2013 | Coronato | G01C 19/5719 73/504.12 |
| 2015/0211854 A1 | 7/2015 | Ruohio et al. | |
| 2015/0330783 A1 | 11/2015 | Rocchi et al. | |
| 2016/0025492 A1 | 1/2016 | Rocchi | |
| 2016/0341551 A1 | 11/2016 | Cook et al. | |
| 2017/0234684 A1 | 8/2017 | Coronato et al. | |
| 2018/0031601 A1 | 2/2018 | Anac et al. | |
| 2018/0231384 A1* | 8/2018 | Johnson | G01C 19/5656 |
| 2020/0263987 A1* | 8/2020 | Blomqvist | G01C 19/574 |
| 2020/0263989 A1* | 8/2020 | Blomqvist | G01C 19/5712 |

OTHER PUBLICATIONS

Finnish Search Report dated Sep. 10, 2019 corresponding to Finnish Patent Application No. 20195119.

* cited by examiner

| 11 | ⇨ | primary mode |
| 12 | ➡ | secondary mode in z-axis rotation |
| 13 | ⊕ ⊙ | secondary mode in x-axis rotation |
| 14 | ⊗ ⊙ | secondary mode in y-axis rotation |

MULTIAXIS GYROSCOPE WITH SYNCHRONIZATION FRAME

FIELD OF THE DISCLOSURE

This disclosure relates to microelectromechanical gyroscopes, and more particularly to multiaxis gyroscopes where the same oscillating proof mass system can be used for measuring angular rotation about one, two or three mutually perpendicular rotations axes.

BACKGROUND OF THE DISCLOSURE

A general problem in microelectromechanical (MEMS) gyroscopes utilizing oscillating proof masses is that the masses should preferably be easily driven into a primary oscillation mode (which may also be called the drive oscillation mode) by drive actuators and also be easily set into a secondary oscillation mode (which may also be called the sense oscillation mode) by the Coriolis force, but still preferably not be moved by external disturbances. In other words, a gyroscope should preferably be unperturbed by linear and rotational vibrations imparted to it by surrounding elements, so that its output signal is determined only by the angular rotation rate which the gyroscope undergoes within the intended measurement frequency range. In automotive applications, for example, the disturbing vibrations typically lie in the frequency range 1 . . . 50 kHz, whereas the measurement frequency range is typically below 1 kHz.

A simple MEMS gyroscope may be constructed utilizing only one oscillating proof mass, but its output signal will typically be very noisy if external vibrations are present at a frequency close to the operating frequency of the gyroscope. Such a gyroscope is practical only at operating frequencies above 50 kHz where the sensitivity of the gyroscope may be very low and other disturbing effects, such as quadrature signals that arise from manufacturing imperfections, may become very prominent. It is known that a proof mass system where two or four proof masses oscillate in anti-phase can be made much more robust than a one-mass gyroscope because signal components arising from vibrations that induce cophasal movement of the two or four proof masses can be automatically cancelled to some degree via differential measurements. Further, if the cophasal resonant frequency can be brought above 50 kHz without affecting the differential resonant frequency, the gyroscope may be very robust to external vibrations since there is no resonance amplification for the disturbing vibrations.

Some MEMS gyroscopes are designed for measuring rotation rate about one axis which is perpendicular to the device substrate. Such gyroscopes may be called z-axis gyroscopes. Other MEMS gyroscopes are designed for measuring rotation rate about either of the two perpendicular axes which lie within the substrate plane. Such gyroscopes may be called x-axis gyroscopes and/or y-axis gyroscopes.

A multi-axis gyroscope can be created by incorporating two or three one-axis gyroscopes for different axes of rotation in the same device. This kind of multi-axis gyroscope will have two or three discrete operating frequencies, which makes the design of the electronic circuit difficult. Multiple sustaining and stabilizing circuits are then also needed for the primary oscillation. Some multiaxis MEMS gyroscopes are designed for measuring rotation rate about the x-, y-, and/or z-axis with the same set of oscillating proof masses to avoid the possible interference between different frequencies.

It is difficult to make multiaxis gyroscopes based on a single oscillation frequency robust against external disturbances because all the proof masses must be given freedom to oscillate in many different directions in order to be free to assume any of the secondary oscillation modes associated with angular rotation about the three mutually orthogonal axes. External vibrations must still be suppressed in the partly flexible suspension and coupling arrangements which attach the proof masses to a fixed structure or cancelled in differential measurements. It is difficult to obtain robustness against external vibrations and isolation of all oscillation modes from energy leakage in multiaxis gyroscopes utilizing two or four proof masses.

Document US2012048017 discloses a multiaxis gyroscope where the primary oscillation involves four masses simultaneously oscillating radially in relation to a center point. The z-axis secondary oscillation mode cannot easily be decoupled from the x-axis and y-axis secondary oscillation modes in this arrangement.

BRIEF DESCRIPTION OF THE DISCLOSURE

An object of the present disclosure is to provide an apparatus for alleviating the above disadvantages.

The object of the disclosure is achieved by an arrangement which is characterized by what is stated in the independent claims. The preferred embodiments of the disclosure are disclosed in the dependent claims.

The disclosure is based on the idea of utilizing a proof mass quartet and a detection mass quartet, and a synchronization frame around these proof masses. The proof masses are attached to the synchronization frame to facilitate synchronization of the x-axis and y-axis secondary oscillation modes. The detection masses are attached to the proof masses by lateral and transversal corners springs which transmit z-axis secondary oscillation from the proof masses to the detection masses. The lateral and transversal corner springs are dimensioned so that the detection masses remain substantially stationary when the proof masses oscillate in the primary oscillation mode, and when they oscillate in the x-axis and y-axis secondary oscillation modes.

BRIEF DESCRIPTION OF THE DRAWINGS

In the following the disclosure will be described in greater detail by means of preferred embodiments with reference to the accompanying drawings, in which FIG. 1 explains the symbols used in FIGS. 2a-2f.

DETAILED DESCRIPTION OF THE DISCLOSURE

Figures 1, 2A:
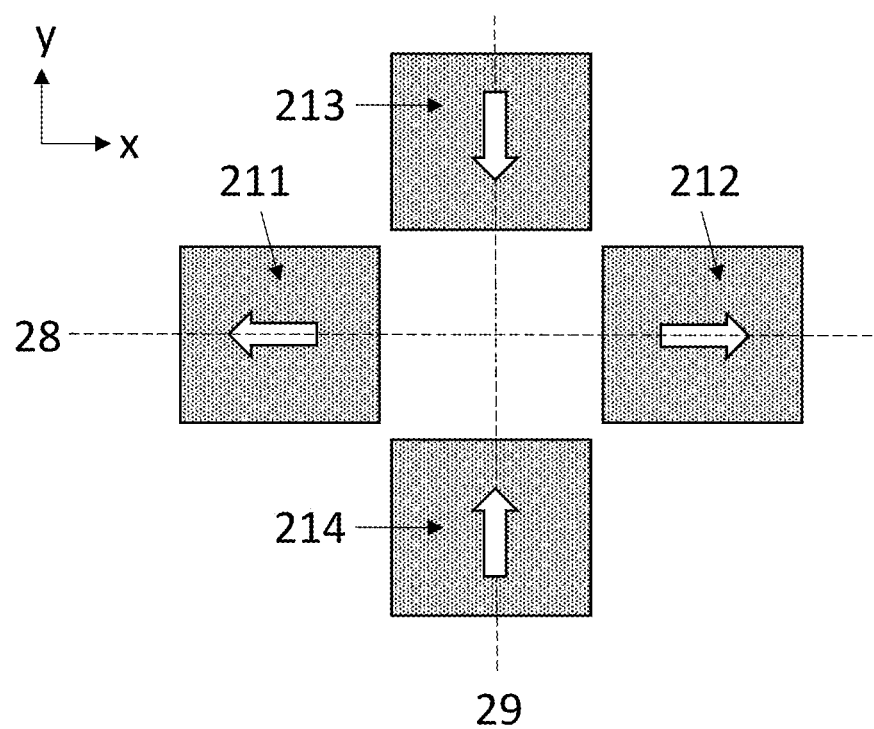
FIGS. 2a-2d illustrate a first primary oscillation mode and corresponding secondary oscillation modes.

This disclosure describes a microelectromechanical gyroscope comprising first, second, third and fourth proof masses which form a proof mass quartet. Said proof masses are in their rest positions symmetrically arranged around a gyroscope center point where a lateral axis crosses a transversal axis orthogonally in a device plane, and where a vertical axis crosses both the lateral and the transversal axis orthogonally.

The first and second proof masses are aligned on the lateral axis in their rest position, and the third and fourth proof masses are aligned on the transversal axis in their rest position. The gyroscope comprises a central anchor point located at the gyroscope center point.

The gyroscope further comprises one or more drive transducers for setting the proof mass quartet into a primary oscillation mode, and one or more sense transducers for detecting oscillation of the proof mass quartet in a z-axis, x-axis and/or y-axis secondary oscillating mode induced by the Coriolis force when the gyroscope undergoes angular rotation about the vertical, lateral, and/or transversal axes, respectively.

The gyroscope further comprises a central suspension arrangement for suspending the proof mass quartet from the central anchor point. The central suspension arrangement is centred around the gyroscope center point and located closer to the gyroscope center point than the proof mass quartet. Each proof mass in the proof mass quartet is attached to the central suspension arrangement, and the central suspension arrangement flexibly accommodates the primary oscillation mode, the z-axis secondary mode and the x-axis and y-axis secondary modes.

The gyroscope further comprises a synchronization frame which is centred around the quartet center point and located further away from the gyroscope center point than the proof mass quartet. Each proof mass in the proof mass quartet is attached to the synchronization frame with one or more frame suspension springs, and the synchronization frame synchronizes at least the x-axis and y-axis secondary oscillation modes.

The gyroscope comprises first, second, third and fourth detection masses which together form a detection mass quartet which in its rest position is arranged symmetrically around the gyroscope center point. The first and second detection masses are aligned on a first diagonal axis which crosses the lateral axis and the transversal axis at an angle of 45 degrees and crosses the gyroscope center point. The third and fourth detection masses are aligned on a second diagonal axis which is orthogonal to the first diagonal axis and crosses the gyroscope center point.

One or more lateral corner springs extend to each detection mass from the laterally adjacent proof mass, and one or more transversal corner springs extend to each detection mass from the transversally adjacent proof mass.

The one or more lateral corner springs are stiff in the lateral direction and flexible in the transversal direction, and the transversal corner springs are stiff in the transversal direction and flexible in the lateral direction. Both the lateral and transversal corner springs extend in a tangential direction, and they are stiff in the same tangential direction so that any tangential movement in the proof mass is transmitted by the corner spring to the attached detection mass. The lateral and transversal corner springs are flexible in the radial direction and in the vertical direction, so that radial movement and out-of-plane movement in the proof mass is not transmitted (or only very weakly transmitted) to the detection masses.

In this context, these "stiff/flexible" properties of the corner springs may, for example, mean that when only one lateral/transversal corner spring is used between each proof mass and detection mass, the spring constant of those corner springs for bending in the tangential direction may be at least 1.3 times, preferably at least 10 times, greater than their spring constant for bending in the radial and/or the vertical direction. However, these requirements may be different if more than one corner spring is attached between each proof mass and detection mass, and the requirements may also vary with the size of the proof masses and detection masses, and with the placement of the attachment points for the corner springs. Furthermore, vertical flexibility may alternatively be created by attaching the corner springs with torsionally flexible fasteners to both the proof masses and the detection masses. The spring constant relationships may also in this case lie beyond the ranges indicated above.

The primary oscillation mode may be a first primary oscillation mode in the device plane, where the first and second proof masses move radially toward the gyroscope center point when the third and fourth proof masses move radially away from the gyroscope center point, and vice versa. Alternatively, the primary oscillation mode may be a second primary oscillation mode in the device plane, where the first, second, third and fourth proof masses all simultaneously move radially toward and then away from the gyroscope center point.

Corresponding first and second z-axis secondary oscillation modes occur in the proof mass quartet in response to angular rotation about the vertical axis. The first z-axis secondary oscillation mode comprises in-plane tangential oscillation where the first and second proof masses move clockwise in relation to the gyroscope center point when the third and fourth proof masses move tangentially anti-clockwise, and vice versa. The second z-axis secondary oscillation mode comprises in-plane tangential oscillation where the first, second, third and fourth proof mass all simultaneously move clockwise and then anti-clockwise in relation to the gyroscope center point.

An x-axis secondary oscillation mode of the proof mass quartet occurs in the proof mass quartet in response to angular rotation about the lateral axis. The x-axis secondary oscillation mode comprises out-of-plane tangential oscillation where the third and fourth proof masses simultaneously move clockwise and then anti-clockwise in relation to the gyroscope center point in the transversal-vertical-plane.

A y-axis secondary oscillation mode of the proof mass quartet occurs in the proof mass quartet in response to angular rotation about the transversal axis. The y-axis secondary oscillation mode comprises out-of-plane tangential oscillation where the first and second proof masses simultaneously move clockwise and then anti-clockwise in relation to the gyroscope center point in the lateral-vertical plane.

The gyroscope comprises one or more sense transducers for detecting oscillation of the proof mass quartet in the first or second z-axis secondary oscillation mode and the x-axis and y-axis secondary oscillating modes.

In this disclosure the device plane is illustrated and referred to as the xy-plane. It may also be called the horizontal plane The z-axis is perpendicular to the xy-plane. It may also be called the vertical axis. Linear and/or rotational motion where the proof mass remains level in the device plane when it moves away from its rest position may be referred to as "in-plane" motion or "motion in the device plane", while linear and/or rotational motion where the proof mass moves away from its rest position in a vertical direction may be referred to as "out-of-plane" motion, or "motion out of the device plane".

In the remaining parts of this disclosure, rotation about any axis perpendicular to the device plane will be referred to as rotation about the z-axis. Similarly, rotation about any axis parallel to the illustrated x-axis will be referred to as rotation about the x-axis, and rotation about any axis parallel to the illustrated y-axis will be referred to as rotation about the y-axis.

In this disclosure, "radial" oscillation refers to linear movement in the xy-plane, away from a central point and towards a central point. "Tangential" oscillation refers to movement in the xy-plane, the xz-plane (lateral-vertical), or the yz-plane (transversal-vertical), along the tangent of an imaginary circle centered at a central point. Tangential oscillation in the xy-plane may be called in-plane tangential oscillation, while tangential oscillation in the xz- and yz-planes may be called out-of-plane tangential oscillation. Tangential oscillation may in practice be a mixture of linear movement and rotation. The suspension arrangement will determine how the proof masses move tangentially.

In the figures of this disclosure, the placement of the proof masses in the first proof mass quartet corresponds to their rest positions unless otherwise stated. The oscillation directions of the proof masses in the different embodiments of this disclosure, and the phase relationships between the oscillations, will be illustrated using the symbols presented in FIG. 1. The white arrow shown on row 11 illustrates the primary oscillation mode which occurs in the device plane. The black arrow on row 12 illustrates the secondary mode which will occur (in the device plane) when the gyroscope undergoes rotation about the z-axis. The pair of symbols illustrated on row 13 will be used together to illustrate the out-of-plane movement of a pair proof masses when the gyroscope undergoes rotation about the x-axis. The pair of symbols illustrated on row 14 will be used together to illustrate the out-of-plane movement of a pair proof masses when the gyroscope undergoes rotation about the y-axis.

FIG. 2a illustrates schematically a microelectromechanical gyroscope with a proof mass quartet and its primary oscillation mode.

The gyroscope comprises a first proof mass 211, a second proof mass 212, a third proof mass 213, and a fourth proof mass 214. Together, these four proof masses form the proof mass quartet. The gyroscope center point is the point where the lateral axis 28 crosses the transversal axis 29.

All proof masses may be suspended from a fixed support by flexible suspension springs (not illustrated in FIG. 2a) which allow oscillating movement. The gyroscope may also comprise capacitive or piezoelectric actuators (not illustrated in FIG. 2a) and a control unit which is configured to apply one or more drive voltage signals to the actuators. The control unit can thereby drive the primary oscillation of the proof masses. When the gyroscope undergoes rotation about the x-, y- or z-axis, the Coriolis force sets at least some proof masses into secondary oscillation.

The gyroscope may further comprise coupling springs which synchronize the motion of the proof masses so that the desired oscillation phases, which will be described in more detail below, are obtained. Some proof masses may not be directly connected to actuators. Their primary oscillation may instead be indirectly actuated by coupling springs which transmit the motion of an actuator-driven proof mass to the proof mass which is not directly connected to actuators.

The suspension springs may include a central suspension arrangement formed near the gyroscope center points and a peripheral suspension arrangement which may support the weight of the proof masses, and/or the weight of peripheral synchronization structures, near the periphery of the gyroscope. These suspension arrangements may have a synchronizing function, as described in more detail below.

Figure 2B:
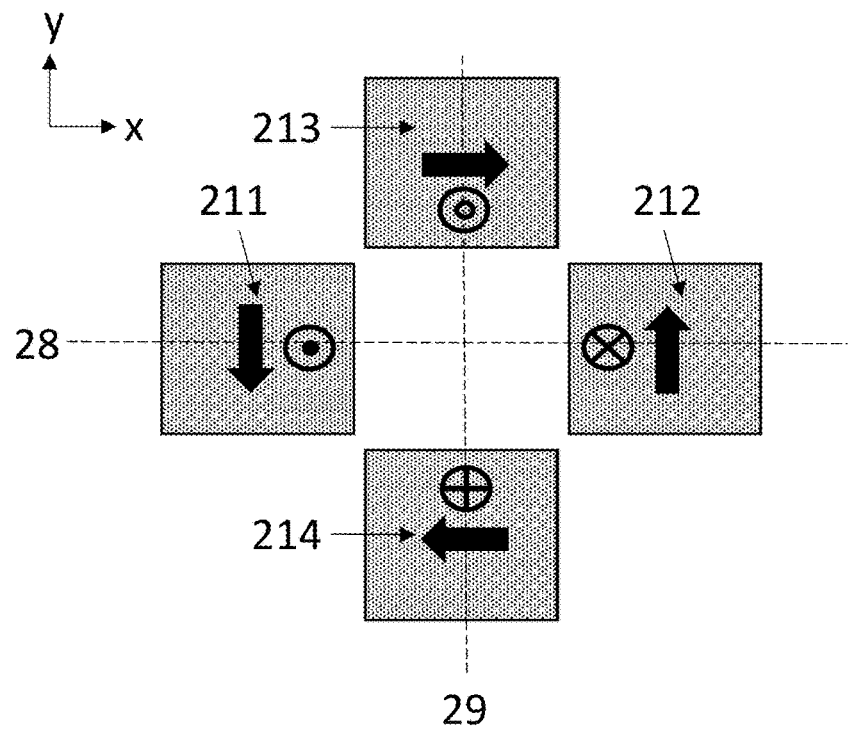

FIGS. 2a and 2b illustrate the first primary oscillation mode and the consequent secondary oscillation modes. The first primary oscillation mode comprises motion where each proof mass oscillates in a radial direction in relation to the gyroscope center point. The first proof mass 211 and second proof mass 212 move away from the gyroscope center point when the third proof mass 213 and the fourth proof mass 214 move towards it, as illustrated in FIG. 2a. In the opposite half of the oscillation cycle these directions are reversed.

The secondary oscillation modes of the proof mass quartet include a first z-axis secondary mode, an x-axis secondary mode, and a y-axis secondary mode.

In response to rotation of the gyroscope about the z-axis, the first z-axis secondary mode comprises motion where each proof mass oscillates tangentially in the device plane (in relation to the gyroscope center point). In response to rotation of the gyroscope about the x-axis, which is parallel to the lateral axis, the x-axis secondary mode comprises motion where the proof mass pair formed by the third and fourth proof 213 and 214 masses oscillates tangentially out of the device plane in the yz-plane. And in response to rotation of the gyroscope about the y-axis, which is parallel to the transversal axis, the y-axis secondary mode comprises motion where the proof mass pair formed by the first and second proof masses 211 and 212 oscillates tangentially out of the device plane in the xz-plane.

FIG. 2b illustrates these secondary oscillation modes. In response to rotation of the gyroscope about the z-axis, the Coriolis force will oscillate all proof masses tangentially in the device plane. The anti-phase primary oscillation mode induces a corresponding anti-phase secondary oscillation mode where the first proof mass 211 and the and the second proof mass 212 move anti-clockwise when the third proof mass 213 and the fourth proof mass 214 move clockwise, and vice versa, as illustrated in FIG. 2b.

Capacitive or piezoelectric measurement transducers may be used to determine in-plane oscillation amplitudes in the z-axis secondary oscillation mode. As described in more detail below, these transducers may be configured to measure the movement of detection masses which are not illustrated in FIG. 2b.

In response to rotation of the gyroscope about the x-axis, the Coriolis force will oscillate the proof mass pair 213+214 formed by the third and fourth proof masses out of the device plane, tangentially in relation to the gyroscope center point as Illustrated symbolically in FIG. 2b. These proof mass pairs may be joined to each other by central and/or peripheral suspension and coupling springs. Such springs are not illustrated in FIG. 2b for clarity reasons but will be discussed below. Due to the anti-phase primary oscillation, one proof mass in the proof mass pair will oscillate in a first out-of-plane direction and the other in the opposite out-of-plane direction.

In response to rotation of the gyroscope about the y-axis, the Coriolis force will oscillate the proof mass pair 211+212 formed by the first and second proof masses out of the device plane, tangentially in relation to the gyroscope center point as illustrated symbolically in FIG. 2b. As before, these proof mass pairs may be joined to each other with central and/or peripheral suspension and coupling springs, and due to the anti-phase primary oscillation, one proof mass in the proof mass pair will oscillate in a first out-of-plane direction and the other in the opposite out-of-plane direction.

Capacitive or piezoelectric measurement transducers may be used to determine out-of-plane oscillation amplitudes in the x-axis and y-axis secondary oscillation modes.

Figure 2C:
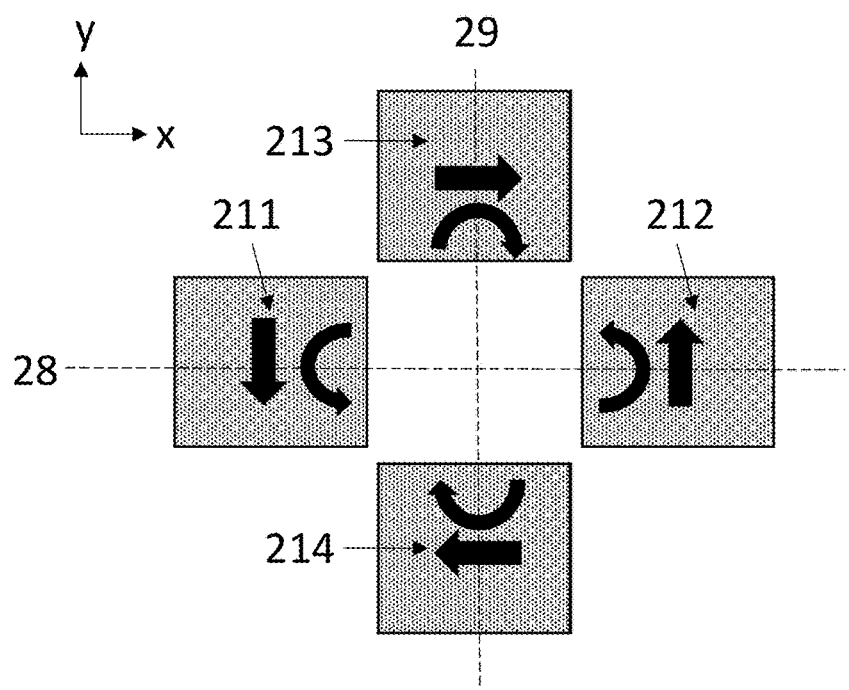
Figure 2D:
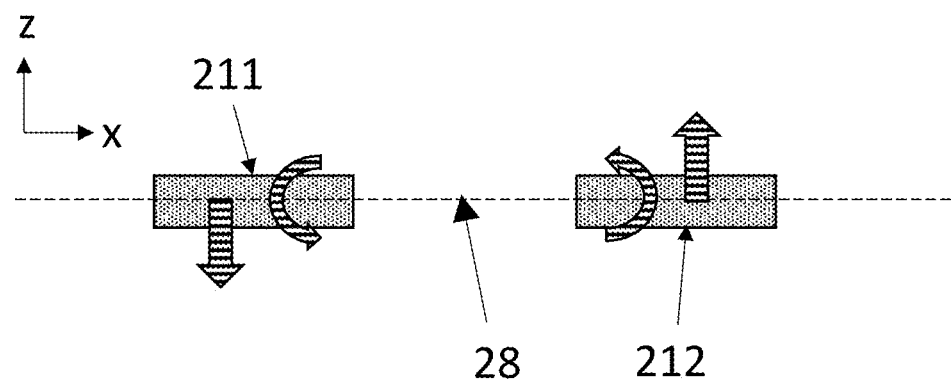

In practice, tangential oscillation may be a combination of linear and rotational movement FIG. 2c illustrates tangential in-plane oscillation as a mixture of linear movement and rotation. FIG. 2d illustrates out-of-plane tangential oscillation as a mixture of linear movement and rotation. The suspension arrangement will determine which component, linear movement or rotation, will predominate.

Figure 2E:
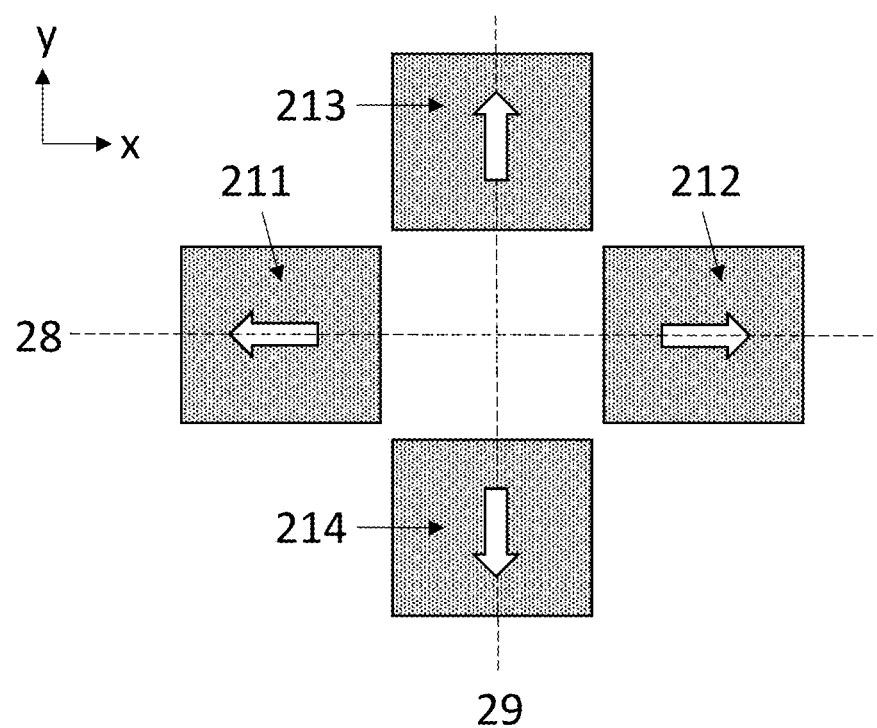
FIGS. 2e-2f illustrate a second primary oscillation mode and corresponding secondary oscillation modes.
Figure 2F:
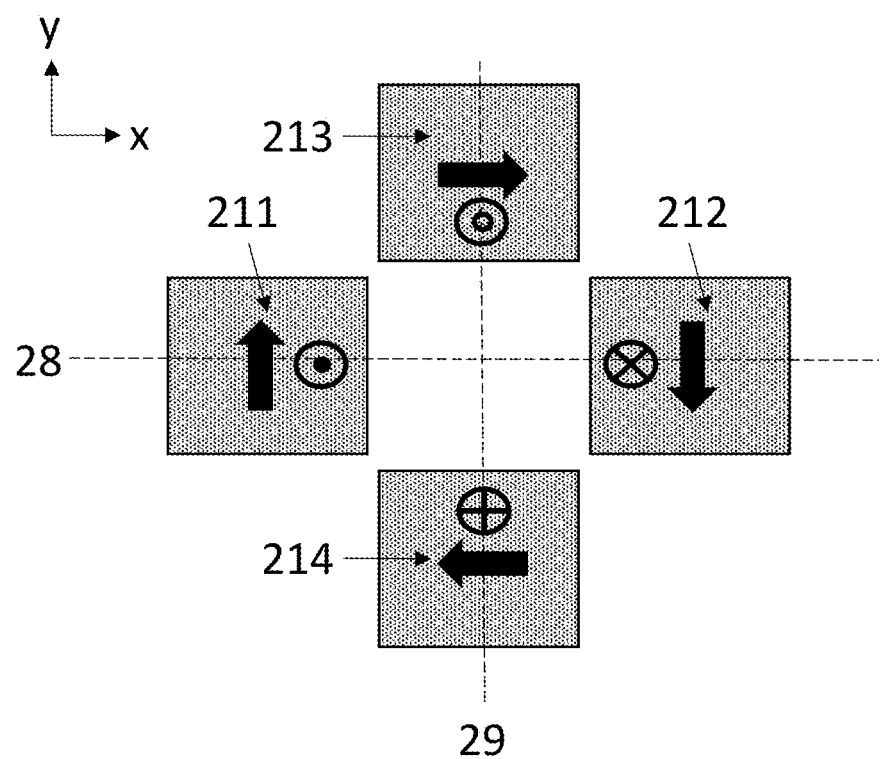

FIGS. 2e and 2f illustrate the second primary oscillation mode and the consequent secondary oscillation modes. The second primary oscillation mode comprises motion where each proof mass oscillates in a radial direction in relation to the gyroscope center point. However, as shown in FIG. 2e, in this case all four proof masses simultaneously move away from the gyroscope center point. In the opposite half of the oscillation cycle, all masses simultaneously move toward the gyroscope center point.

The secondary oscillation modes of the proof mass quartet include a second z-axis secondary mode, an x-axis secondary mode, and a y-axis secondary mode. The x-axis and y-axis secondary modes are identical to the x-axis and y-axis secondary modes which arise from x- and y-axis rotation when the first primary oscillation mode is used. Only the second z-axis secondary mode will therefore be described below.

FIG. 2f illustrates the second z-axis secondary oscillation mode. In response to rotation of the gyroscope about the z-axis, the Coriolis force will oscillate all proof masses tangentially in the device plane. The in-phase primary oscillation mode induces a corresponding in-phase secondary oscillation mode where all proof masses move simultaneously clockwise. In the opposite part of the oscillation cycle, all proof masses move simultaneously anti-clockwise.

As before, capacitive or piezoelectric measurement transducers may be used to determine in-plane oscillation amplitudes in the z-axis secondary oscillation mode.

Throughout this disclosure, the terms "accommodate" and "facilitate", and phrases such as "structure A accommodates/facilitates oscillation mode X", have the following meaning. X designates a desired primary or secondary oscillation mode illustrated in FIGS. 2a-2f. The spring constant which structure A exhibits in the movement required by mode X is sufficiently small to allow the output signals measured from all secondary oscillation modes to be detected with sufficient accuracy. The required spring constant will not depend only on A and X, but also for example on the sense transducers and on output signal conditioning.

Throughout this disclosure, the term "synchronize", and phrases such as "structure A synchronizes oscillation mode X", have the following meaning. Structure A constitutes a mechanical connection in a system of interconnected mass elements which should preferably oscillate in the desired mode X, but preferably not in an undesired mode Y. Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative, standard structure B which only gives structural support.

In general, all suspension arrangements are optimized for support as well as flexibility in certain directions and rigidity in other directions. These three variables may conflict with each other, so optimization means finding a good compromise solution. All elements of the gyroscope may influence these compromises.

In any embodiment presented in this disclosure, capacitive drive transducers may for example be implemented in openings formed within at least some, possibly all of the proof masses in the proof mass quartet, or in openings formed within the central suspension arrangement. Examples of both of these openings are illustrated by white areas in FIG. 8 below. Capacitive sense transducers may be implemented either within an opening in one or more proof masses or adjacent to one or more proof masses to detect the z-axis secondary oscillation mode.

Capacitive sense transducers may be implemented above and/or below one or more proof masses to detect the x-axis and/or y-axis secondary oscillation modes. Capacitive sense transducers may alternatively or complementarily be implemented above/below the synchronization frame to detect the same modes.

The drive and sense transducers may alternatively be piezoelectric transducers. Transducers are not illustrated in the figures of this disclosure.

Figure 3A:
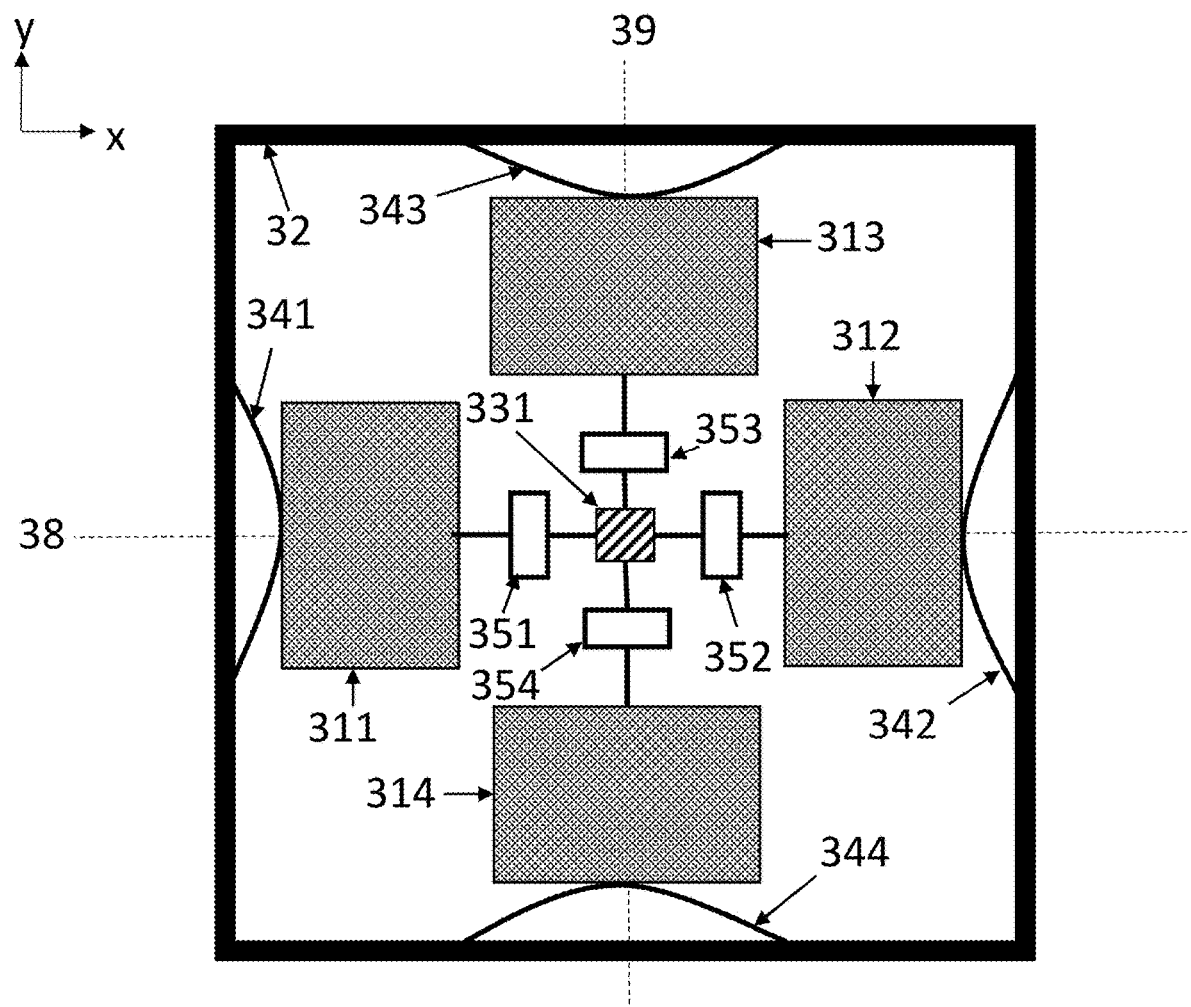
FIGS. 3a-3b illustrate a peripheral synchronization frame and frame suspension springs.

FIG. 3a illustrates a microelectromechanical gyroscope with a central suspension arrangement and a peripheral synchronization frame. Reference numbers 311-314 and 38-39 correspond to reference numbers 211-214 and 28-29 in FIGS. 2a-2f, respectively. The first, second, third and fourth proof masses 311-314 form a proof mass quartet centered around the gyroscope center point. A central anchor point 331 is located at the gyroscope center point. Detection masses and drive and sense transducers are not illustrated.

The central suspension arrangement comprises central suspension springs 351-354. Each central suspension spring extends from the central anchor point 331 to the corresponding proof mass. The central suspension springs 351-354 are flexible in the radial direction to accommodate the primary oscillation mode, but relatively stiff in the vertical direction to support the weight of the proof masses 311-314. Furthermore, the central suspension springs also exhibit some torsional flexibility to accommodate out-of-plane tangential oscillation of the proof masses in the x-axis and y-axis secondary modes, and some flexibility for in-plane bending to accommodate the z-axis secondary modes. The central suspension springs may, for example, be meandering springs.

The gyroscope comprises a synchronization frame 32. The gyroscope also comprises four or more frame suspension springs 341-344. Each proof mass 311-314 is attached to the synchronization frame 32 with a corresponding frame suspension spring 341-344. In the illustrated device, each frame suspension spring is an elongated spring which extends from a first attachment point on the synchronization frame 32 to a second attachment point on the synchronization frame 32. The midpoint of the frame suspension spring is attached to the corresponding proof mass. This configuration gives the frame suspension springs radial flexibility to flexibly allow the primary oscillation mode of the proof mass quartet.

The frame suspension springs 341-344 lack flexibility in the in-plane tangential direction. This allows the synchronization frame 32 to synchronize the second z-axis secondary oscillation mode illustrated in FIG. 2f. When the masses are driven into the second primary oscillation mode illustrated in FIG. 2e, they will all simultaneously move in the same in-plane tangential direction in the z-axis secondary mode, as illustrated in FIG. 2f. This motion is synchronized by clockwise and counter-clockwise turning of the synchronization frame 32 about the z-axis which crosses the gyroscope center point.

Furthermore, the frame suspension springs are stiff in the vertical direction, so that the synchronization frame 32 synchronizes the x-axis and/or the y-axis secondary oscillation modes through the rotation of the synchronization frame 32 about the transversal axis 39 (in the y-axis secondary mode) or the lateral axis 38 (in the x-axis secondary mode). Frame suspension springs 341-344 are sufficiently thick in the vertical direction to keep the entire proof mass quartet 311-314 at least approximately level with the synchronization frame 32. The synchronization frame 32 can freely turn when the gyroscope undergoes angular motion about either the x-axis or the y-axis.

The turning of the synchronization frame 32 ensures that the first proof mass 311 and the second proof mass 312 move simultaneously in opposite out-of-plane tangential directions when the gyroscope undergoes angular rotation about the y-axis, and that the third proof mass 313 and the fourth proof mass 314 move simultaneously in opposite out-of-plane tangential directions when the gyroscope undergoes angular rotation about the x-axis. However, the synchronization frame 32 is not necessarily entirely rigid. It may twist to some extent, especially when the gyroscope simultaneously undergoes angular rotation about both the x-axis and the y-axis.

Figure 3B:
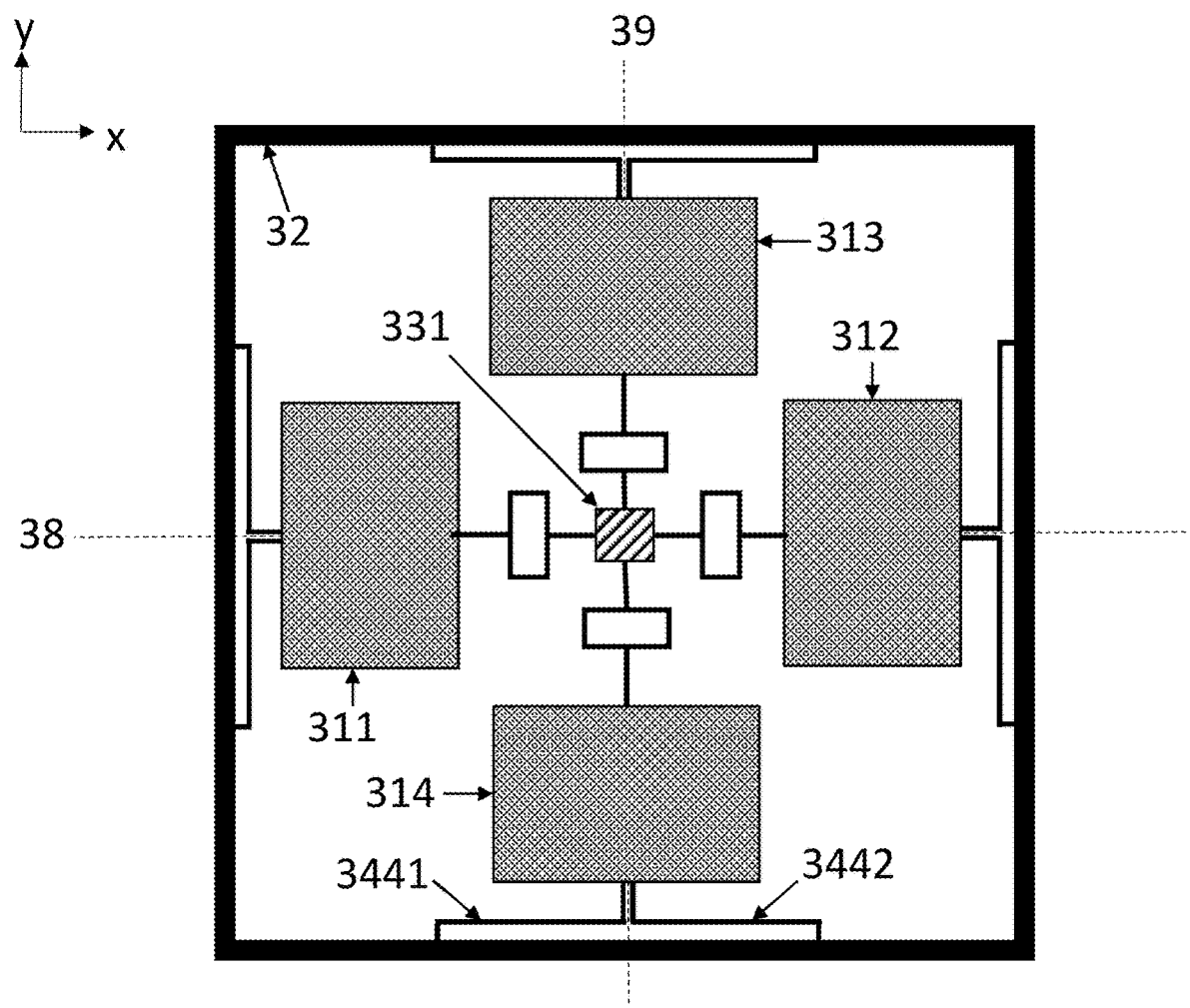

The frame suspension springs 341-344 illustrated in FIG. 3a do not accommodate the first z-axis secondary oscillation mode because they lack in-plane tangential flexibility. FIG. 3b illustrates alternative frame suspension springs which provide the tangential flexibility which especially the first secondary oscillation mode needs.

As shown in FIG. 3b, the number of frame suspension springs may be greater than four, so that some or all proof masses in the proof mass quartet are suspended from the synchronization frame 32 with more than one frame suspension springs. FIG. 3b illustrates an alternative embodiment where each proof mass in the proof mass quartet is attached to the synchronization frame 32 with two frame suspension springs, such as 3441-3442. In this case each frame suspension spring 3441 and 3442 extends from a first attachment point on the synchronization frame 32 to a second attachment point on the adjacent proof mass. The frame suspension springs 3441 and 3442 comprise both lateral and transversal elongated parts which give the springs both radial and tangential flexibility. The elongated part which is parallel to the adjacent side of the synchronization frame may be longer than the part which is orthogonal to that side, since the amplitude of the radial primary oscillation mode is typically significantly larger than the amplitude of the tangential secondary oscillation mode.

The frame suspension springs 341-344 illustrated in FIG. 3a can be used if the second primary oscillation mode is used. The synchronization of the second z-axis secondary mode is then very effective. The frame suspension springs 3441-3442 illustrated in FIG. 3b can be used together with the first and the second primary oscillation modes. If they are used with the first primary oscillation mode, the synchronization frame 32 will only synchronize the x-axis and y-axis secondary modes, but not the first secondary oscillation mode where some proof masses move in opposite tangential directions. If the frame suspension springs 3441-3442 are used with the second primary oscillation mode, the synchronization frame 32 can to some extent synchronize also the z-axis secondary mode (in addition to synchronizing the x-axis and y-axis secondary modes). The synchronization provided by the frame 32 to the z-axis secondary mode is weaker with frame suspension springs 3441-3442 than with 341-344 due to the tangential flexibility of springs 3441-3442.

In the embodiments illustrated in FIGS. 3a-3b, the central suspension arrangement exhibits flexibility for out-of-plane motion through torsion in the central suspension springs 351-354. It may in some cases be preferable to obtain more flexibility in the central suspension arrangement for out-of-plane movement by using a central gimbal structure. The torsional twisting required for allowing out-of-plane movement can be concentrated in torsion bars which are specifically designed for this purpose, which makes it easier to ensure sufficient oscillation amplitude in the x-axis and y-axis secondary oscillation modes.

Figure 4A:
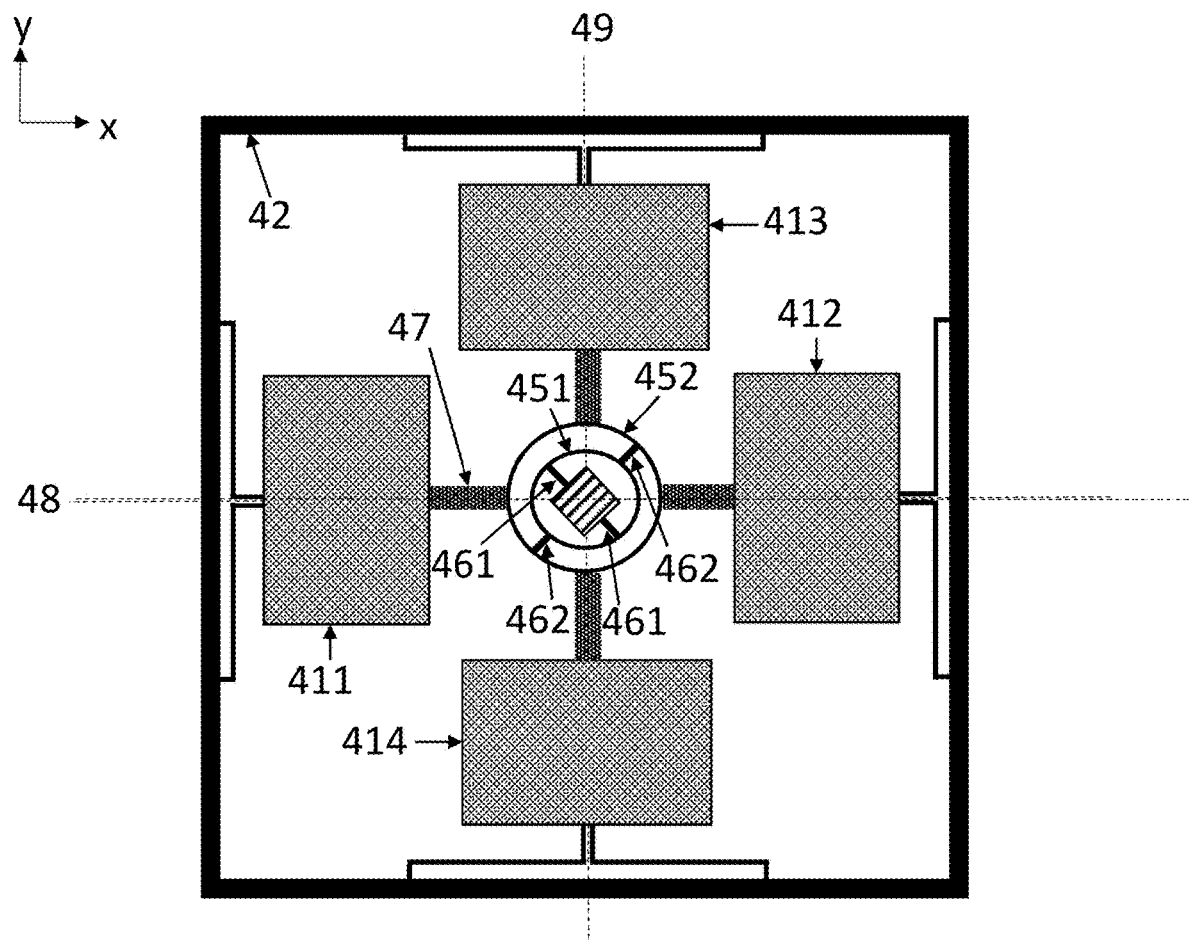
FIGS. 4a-4c illustrate central suspension arrangements.

FIG. 4a, where reference numbers 411-414, 42 and 48-49 correspond to reference numbers 311-314, 32 and 38-39 in FIGS. 3a and 3b, illustrates an alternative embodiment where the central suspension arrangement comprises a central gimbal structure connected to the central anchor point. The central gimbal structure comprises an inner gimbal frame 451 and an outer gimbal frame 452, one or more inner torsion bars 461 and two outer torsion bars 462. The inner torsion bars 461 extend in opposite directions from the central anchor point to the inner gimbal frame 451, and the outer torsion bars 462 extend from opposite sides of the inner gimbal frame 451 to the outer gimbal frame 452 in a direction which is orthogonal to the inner torsion bars 461. Detection masses are not illustrated in FIG. 4a for clarity reasons.

As illustrated in FIG. 4a, the inner torsion bars and outer torsion bars may extend in diagonal directions which are oriented at an angle of 45 degrees in relation to the lateral and the transversal axes. Radial connecting elements 47 may attach each proof mass to the outer gimbal frame 452. Alternatively, the inner and outer torsion bars may extend along the lateral and transversal axis.

Radial connecting elements 47 may exhibit radial flexibility to accommodate the first and second primary oscillation modes. If the first primary oscillation mode is used, then the central gimbal structure may to some extent synchronize the first primary oscillation mode because the inner and outer gimbal frames may undergo elliptical shape transformations which correspond to the inward movement of one proof mass pair and the simultaneous outward movement of the other proof mass pair.

Figure 4B:
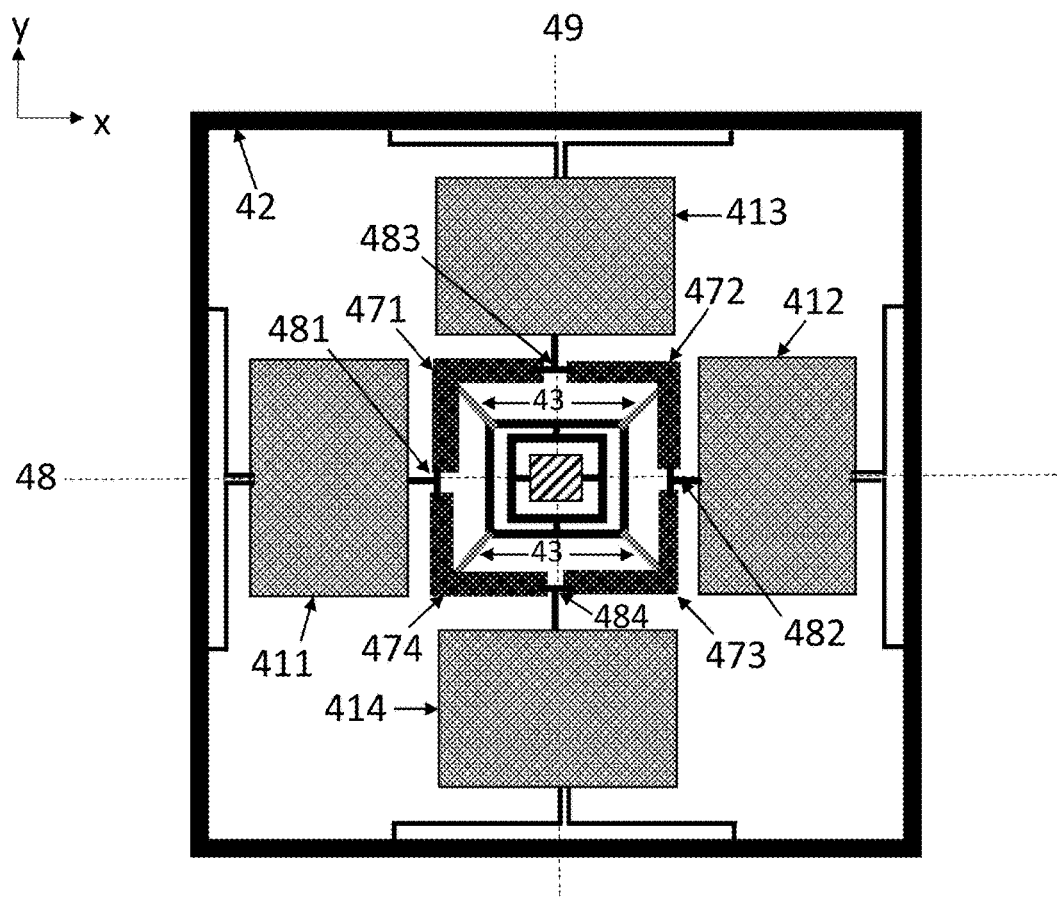

Synchronization of the first primary mode may alternatively be achieved through the central suspension arrangement with the arrangement Illustrated in FIG. 4b. This central suspension arrangement also comprises a central gimbal structure. However, the central suspension arrangement further comprises four orthogonal corner elements 471-474 connected in series, which surround the outer gimbal frame. The corner elements 471-474 form a substantially rectangular shape in their rest positions. The two ends of each corner element (for example 471) are attached to the ends of the adjacent corner elements (for example 472 and 474) with a hinge element (483, 481) which allows in-plane rotation of the attached corner elements with respect to each other. The central suspension arrangement further comprises at least four connection bars 43. Each connection bar 43 extends from the outer gimbal frame to the corner point of the adjacent corner element.

Each proof mass 411-414 in the proof mass quartet is attached to the adjacent hinge connection element 481-484. Each connection bar 43 may be connected to the corner point of the adjacent corner element with an additional hinge connection element (not illustrated), so that the connection bar 43 does not resist the turning motion illustrated in FIG. 4c below.

The hinge connection elements 481-484, connection bars 43, and the inner and outer gimbal frames should preferably be as rigid as possible in the vertical direction, so that they as much as possible synchronize the x-axis secondary oscillation mode and the y-axis secondary oscillation mode which involve out-of-plane oscillation.

Figure 4C:
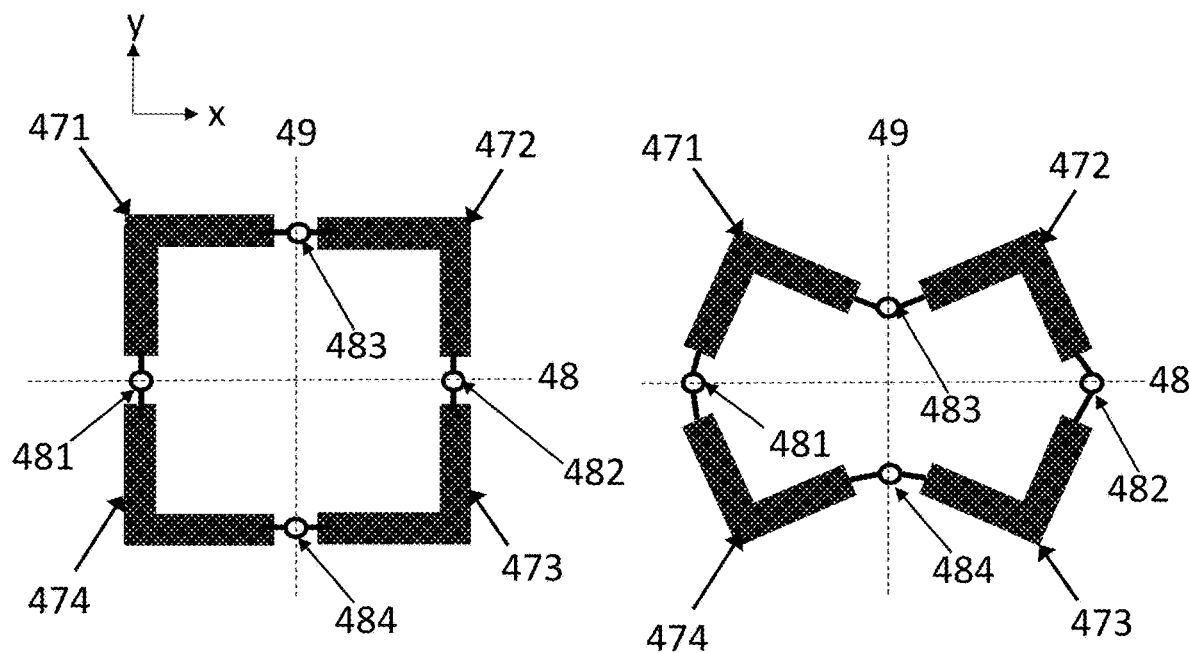

FIG. 4c illustrates the synchronizing function in more detail. The left side of FIG. 4c shows four L-shaped corner elements 471-474 in their rest position, interconnected with four hinge connection elements 481-484. The right side of FIG. 4c illustrates the position of these corner elements in a part of the oscillation cycle where the first and second proof masses in the proof masses quartet have moved away from each other on the lateral axis 48, and the third and fourth proof masses have moved towards each other on the transversal axis 49.

The first and fourth corner elements 471 and 474 have both turned around hinge connection element 481 so that the angle formed by the arms of the hinge-connection element becomes obtuse away from the center point. The second and third corner elements 472 and 473 have also both turned so that the angle formed by their hinge connection element 482 becomes obtuse away from the center point. The angles formed by hinge connection elements 483 and 484, on the other hand, are obtuse in the opposite direction, toward the center point. In the opposite part of the oscillation cycle, which is not illustrated, the angle formed by each hinge connection element will be obtuse in the other direction. The stiffness of each corner element serves to maintain the anti-phase oscillation of the two proof mass pairs 411+412 and 413+414 with respect to the gyroscope center point. Different hinge connection elements could be used, and the illustration in FIGS. 4b and 4c is only schematic.

The central suspension arrangement illustrated in FIG. 4a can be used in combination with any other embodiment in this disclosure, including both the first and secondary primary oscillation modes. The central suspension arrangement illustrated in FIG. 4b can be used only when the first primary oscillation mode is used, but it can be modified analogously to FIG. 5b to accommodate also the second primary oscillation mode.

Figure 5A:
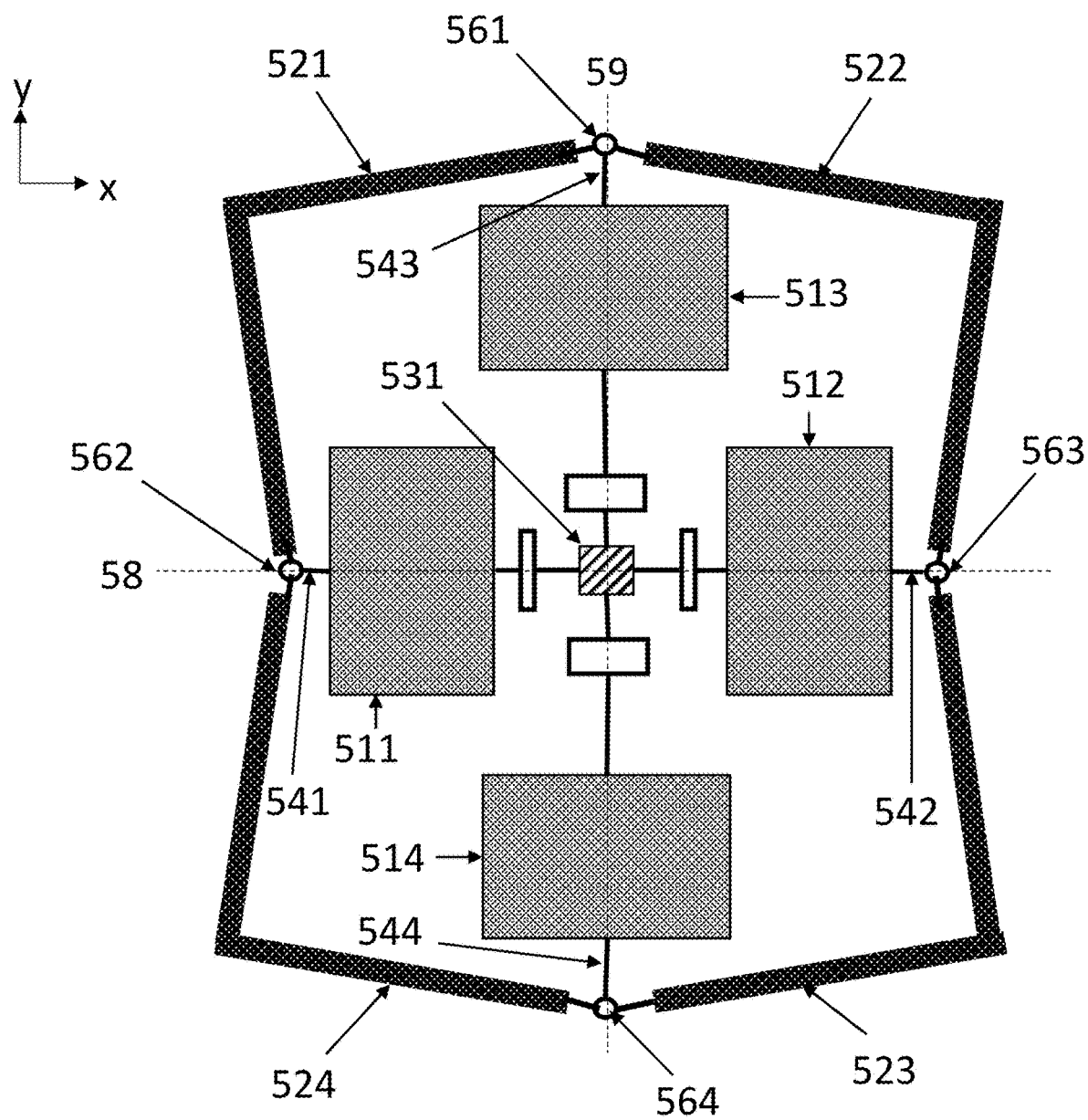
FIGS. 5a-5b illustrate synchronization frames which accommodate and/or synchronize the primary oscillation modes.

It is also possible to use the synchronization frame 32 to synchronize the first primary oscillation mode. FIG. 5a illustrates a device where reference numbers 511-514, 58 and 59 correspond to reference numbers 311-314, 38 and 39, respectively, in FIG. 3a. The synchronization frame comprises four orthogonal corner elements 521-524 connected in series. These elements form a substantially rectangular shape in their rest positions (not Illustrated). The two ends of each corner element (for example 521) may be attached to the ends of the two adjacent corner elements (522, 524) with a hinge element (561, 562) which allows in-plane rotation of the attached corner elements with respect to each other. The peripheral synchronization arrangement may thereby also be configured to synchronize the first primary oscillation mode of the proof mass quartet.

The synchronization mechanism operates according to the same principle as the mechanism in the central suspension arrangement illustrated in FIG. 4c. FIG. 5a illustrates a situation where the first and second proof masses 511 and 512 have moved towards the gyroscope center point, while the third and fourth proof masses 513 and 514 have moved away from it. The stiffness of each corner element serves to maintain the anti-phase oscillation of the two proof mass pairs 511+512 and 513+514 with respect to the gyroscope center point. Since the radial flexibility which accommodates the first primary oscillation mode is in this case provided by the hinge elements 561-564, simple linear frame suspension springs 541-544 without radial flexibility may be used to accommodate tangential movement in the first secondary oscillation mode.

The synchronization frame illustrated in FIG. 5a can be combined with any central suspension arrangement illustrated in this disclosure, but it can only be used with the first primary oscillation mode.

Figure 5B:
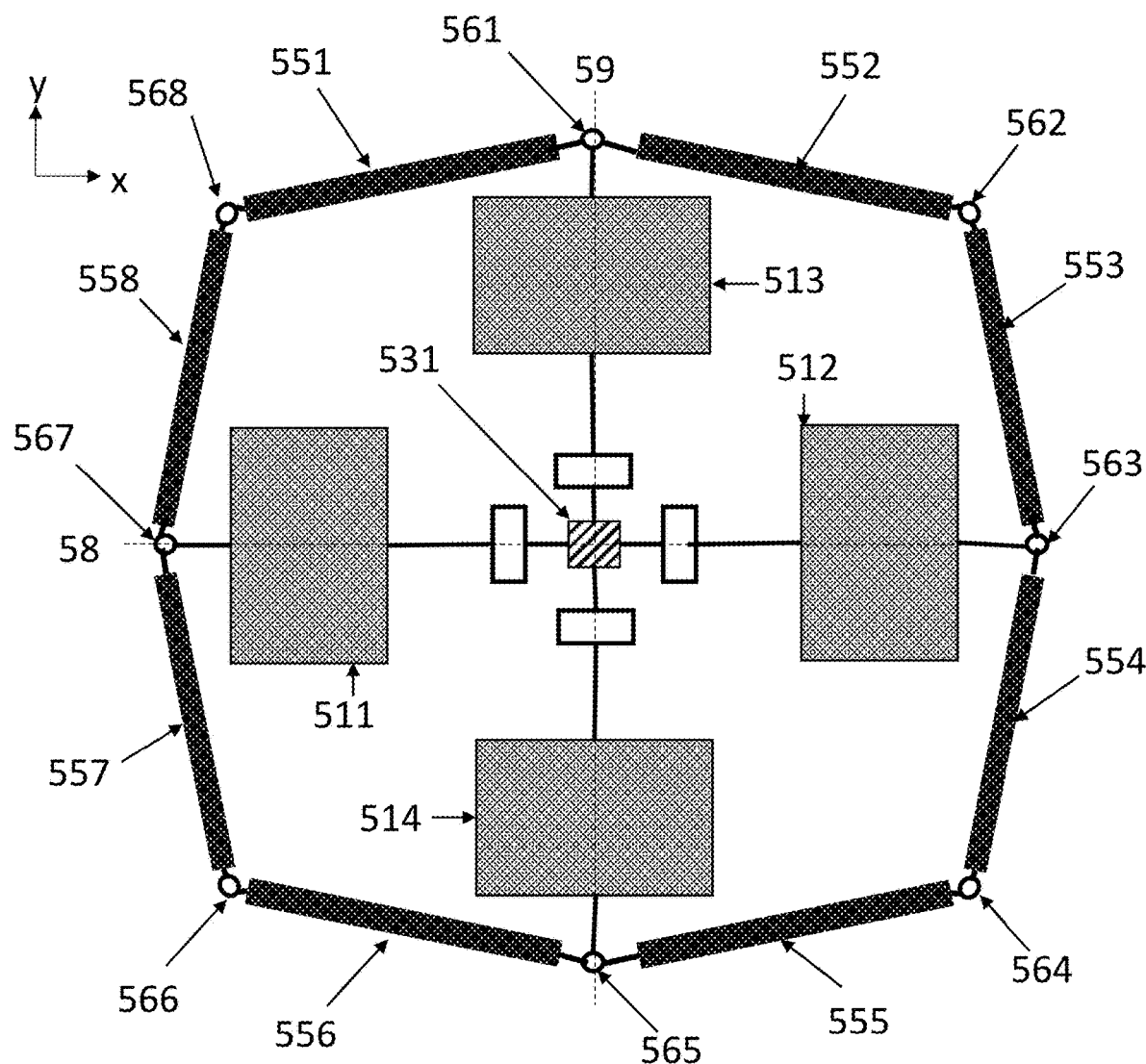

FIG. 5b illustrates an alternative synchronization frame which accommodates the second primary oscillation mode. The synchronization frame comprises eight linear elements 551-558 interconnected with eight hinge elements 561-568. The two ends of each linear element (for example 551) are attached to the ends of the two adjacent linear elements (558, 552) with hinge elements (568, 561) which allows in-plane rotation of the attached linear elements with respect to each other.

FIG. 5b illustrates an oscillation phase where all proof masses 511-514 have simultaneously moved outward and the synchronization frame has expanded to accommodate this movement. The angle between each pair of linear elements connected by a corner hinge element (562, 564, 566 or 568) is greater than 90 degrees. In the other half of the oscillation cycle all proof masses 511-514 will move inward, and the synchronization frame will accommodate this movement so that the angle between each pair of linear elements connected by a corner hinge element (562, 564, 566 or 568) becomes less than 90 degrees.

In the embodiments presented above, the central anchor point served as the only anchor point of gyroscope, so that all elements of the gyroscope were suspended from this anchor point. It may sometimes be necessary to support the weight of these elements also on the periphery of the device.

Figure 6:
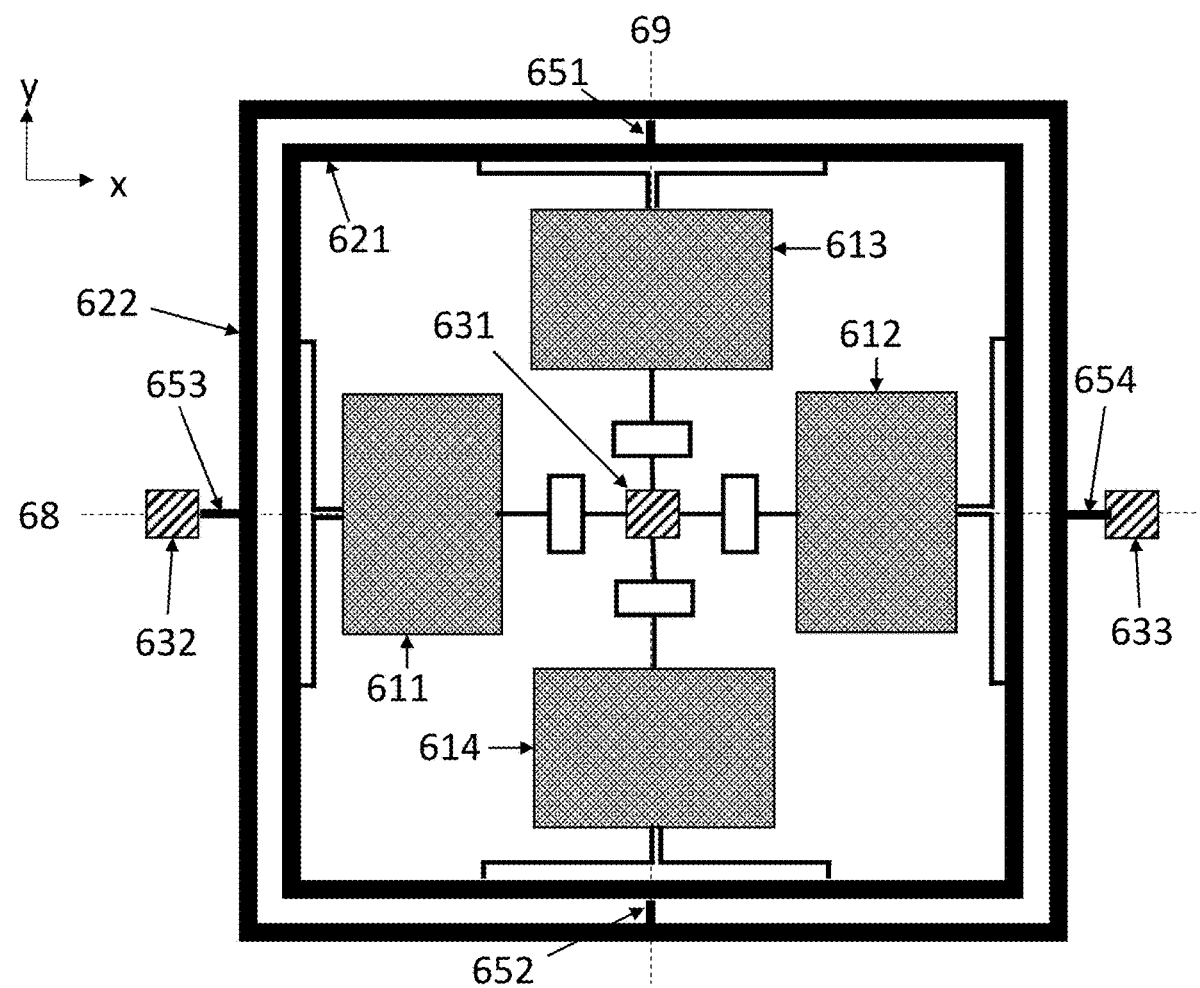
FIG. 6 illustrates a peripheral suspension arrangement.

FIG. 6 illustrates a gyroscope where the peripheral suspension arrangement comprises a peripheral gimbal structure connected to two peripheral anchor points aligned either on lateral axis. These peripheral anchor points may alternatively be aligned on the transversal axis. Detection masses are not illustrated in FIG. 6.

In this embodiment the gyroscope comprises an inner synchronization frame 621 and an outer synchronization frame 622. The peripheral gimbal structure comprises two lateral torsion bars 653 and 654 aligned on the lateral axis 68 to facilitate gimbal rotation about the lateral axis, and two transversal torsion bars 651 aligned on the transversal axis 69 to facilitate gimbal rotation about the transversal axis. The two torsion bars 653 and 654 which are aligned on the same axis as the peripheral anchor points 632 and 633 extend from opposite sides of the outer synchronization frame 622 to the corresponding peripheral anchor points, and the two torsion bars 651 and 652 which are not aligned on the same axis as the peripheral anchor points 632 and 633 extend from opposite sides of the inner synchronization frame 621 to the outer synchronization frame 622.

In other words, if the peripheral anchor points would be aligned on the transversal axis 69, the transversal torsion bars would extend from the outer synchronization frame to these peripheral anchor points, and the lateral torsion bars would extend from the inner synchronization frame 621 to the outer synchronization frame 622.

In the device illustrated in FIG. 6, the weight of the proof masses 611-614 is partly supported by the peripheral suspension arrangement. The peripheral suspension arrangement synchronizes the x-axis secondary oscillation mode of the proof mass quartet through torsional twist in the lateral torsion bars 653 and 654. It synchronizes the y-axis secondary oscillation mode through torsional twist in the transversal torsion bars 651-652. As in the preceding embodiments, the inner and outer synchronization frames 621 and 622 may also exhibit some degree of twisting flexibility. The peripheral suspension arrangement accommodates the primary oscillation mode and the z-axis secondary oscillation mode in the same manner as the peripheral suspension arrangement illustrated in FIG. 3.

The peripheral suspension arrangement illustrated in FIG. 6 can be combined with any other embodiment presented in this disclosure.

It can sometimes be problematic to detect the tangential oscillation of the proof masses in the first z-axis secondary mode when their motion is a combination of linear translation and rotation. Additional detection masses may be added to the gyroscope to facilitate easier detection of this oscillation mode.

Figure 7A:
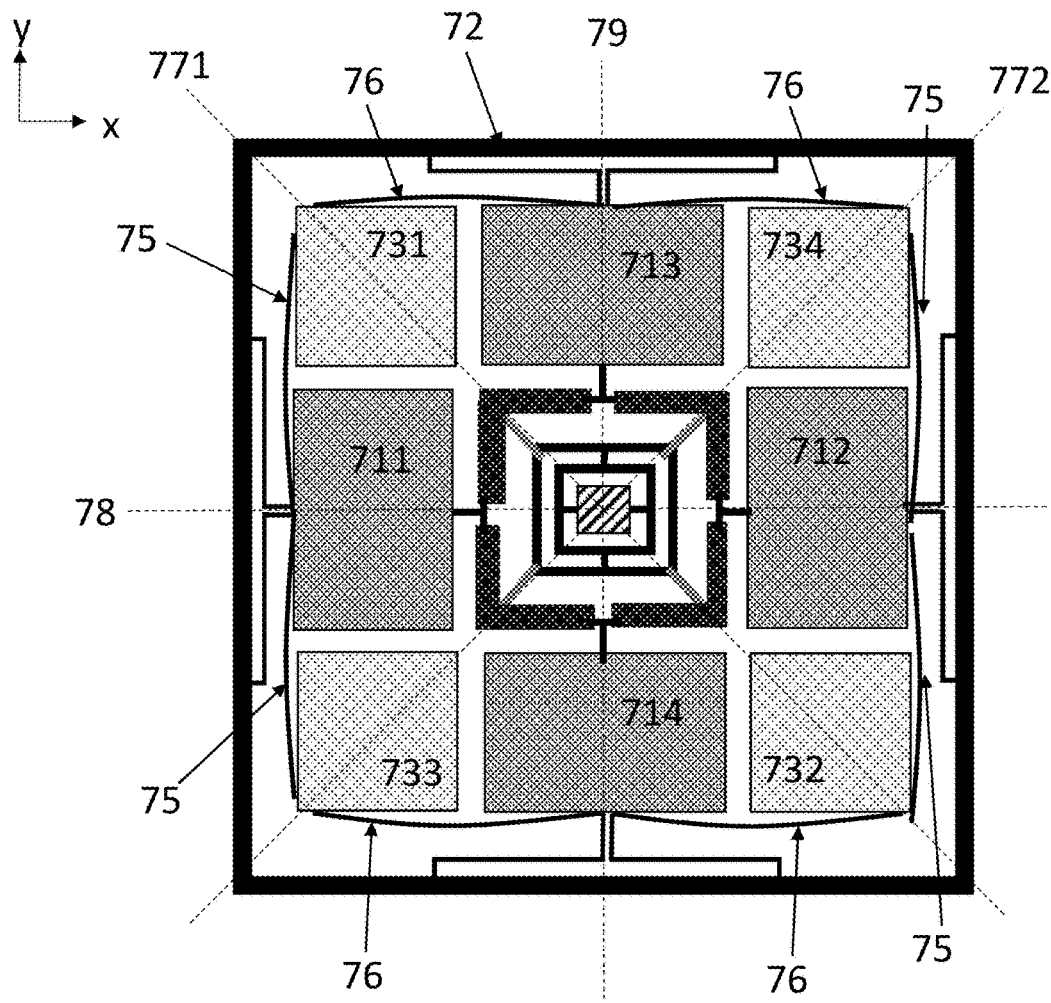
FIGS. 7a-7d illustrate detection masses, their oscillation and their suspension.

FIG. 7a illustrates the detection masses. Reference numbers 711-714 and 72 correspond to reference numbers 311-314 and 32 in FIGS. 3a-3b, 411-414 and 42 in FIGS. 4a-4b, 511-514 and 521-524 in FIG. 5a, 511-514 and 551-558 in FIG. 5b, and to 611-614 and 621 in FIG. 6, respectively. 78 denotes the lateral axis and 79 the transversal axis. Detection masses may be implemented in any device illustrated in FIGS. 3a-6.

The illustrated gyroscope comprises first, second, third and fourth detection masses 731-734 which together form a detection mass quartet which in its rest position is arranged symmetrically around the gyroscope center point. The first and second detection masses 731 and 732 are aligned on a first diagonal axis 771 which crosses the lateral axis 78 and the transversal axis 79 at an angle of 45 degrees and crosses the gyroscope center point. The third and fourth detection masses 733 and 734 are aligned on a second diagonal axis 772 which is orthogonal to the first diagonal axis 771 and crosses the gyroscope center point. One or more lateral corner springs 76 extend to each detection mass 731-734 from the laterally adjacent proof mass 711-714, and one or more transversal corner springs 75 extends to each detection mass 731-734 from the transversally adjacent proof mass 711-714.

The detection masses 731-734 form a detection mass quartet. The detection masses may be placed near the corners of the synchronization frame 72, so that each detection mass occupies one corner.

Together, the proof mass quartet and the detection mass quartet may cover an approximately rectangular area, which may be quadratic, as in FIG. 7a. However, the shapes of the masses in the xy-plane need not necessarily be rectangular. Any suitable shape may be used. The sizes of the detection masses may be adjusted relative to the sizes of the proof masses by varying their shapes in the xy-plane.

Detection masses 731-734 may be utilized to detect the first z-axis secondary oscillation mode in a linear manner. This is facilitated by the corner springs 75 and 76. A transversal corner spring 75 extends from the first proof mass 711 to both the first (731) and the third (733) detection masses, as illustrated in FIG. 7a. A transversal corner spring 75 also extends from the second proof mass 712 to both the second (732) and the fourth (734) detection masses. A lateral corner spring 76 extends from the third proof mass 713 to both the first (731) and the fourth (734) detection masses. A lateral corner spring 76 also extends from the fourth proof mass 714 to both the second (732) and the third (733) detection masses.

Figure 7B:
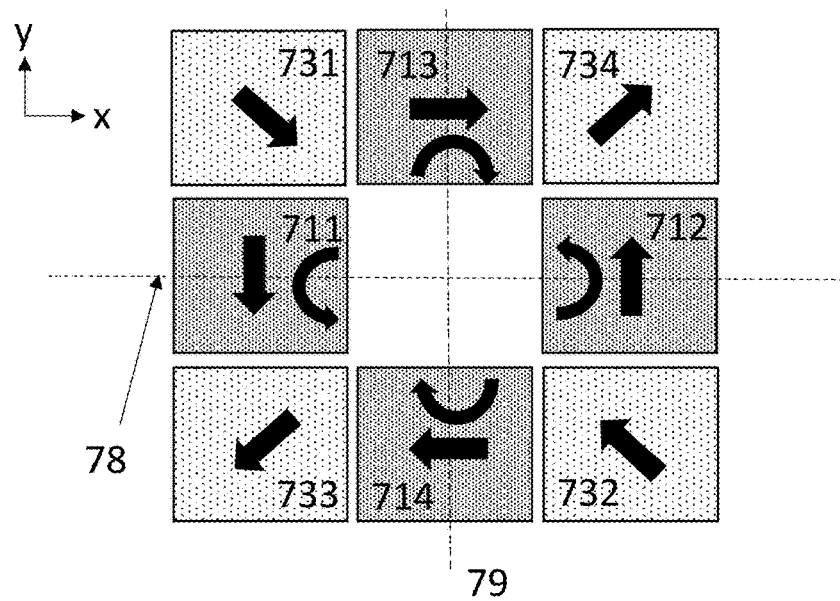

When the proof masses in the proof mass quartet 711-714 oscillate tangentially in the first z-axis secondary mode, this tangential oscillation is transmitted to the detection masses by the lateral and transversal corner springs, as illustrated in FIG. 7b. The oscillation of proof masses 711 and 713 in opposite tangential directions pulls detection mass 731 toward the gyroscope center point, while the oscillation of proof masses 713 and 712 in opposite directions pushes detection mass 734 away from the gyroscope center point. Since the momentum imparted by the corner springs in the lateral and transversal directions is equal (or very close to equal), the detection masses move in radial oscillation along the diagonal axes 771 and 772, in the manner illustrated in FIG. 7b. Unlike the tangential oscillation of the proof masses, this radial oscillation of the detection masses does not contain a component of in-plane rotation.

The one or more lateral corner springs are stiff in the lateral direction and flexible in the transversal direction, while the one or more transversal corner springs are stiff in the transversal direction and flexible in the lateral direction. In other words, due to their dimensions, all corner springs have radial flexibility but are much stiffer in the tangential direction.

This means that the primary oscillation mode of the proof mass quartet 711-714 will not set detection masses 731-734 in motion. Instead, detection masses 731-734 will remain substantially stationary until the gyroscope undergoes rotation about the z-axis. Since the one or more lateral and transversal corner springs are all oriented in the tangential direction, proof mass oscillation in the both the first and second z-axis secondary oscillation modes puts the detection masses in motion. In other words, the corner springs mechanically couple the z-axis secondary oscillation modes strongly to the detection masses, whereas no mechanical coupling between mechanically couples the primary oscillation mode of the proof masses to the detection masses.

The detection masses are not needed for detecting x-axis and y-axis secondary modes, so they may be disconnected from the synchronization frame 72. Their movement is thereby restricted only to the xy-plane, which makes it easy to measure.

Each detection mass may be suspended from a diagonal anchor point (not illustrated) which lies on the diagonal axis 771 or 772 on which the detection mass is aligned. The diagonal anchor point may, for example, be located within an opening formed in said detection mass. The transversal corner springs 75 and the lateral corner springs 76 (and/or the fasteners with attach these springs to the proof masses and the detection masses) may exhibit sufficient flexibility in the vertical direction (or torsional flexibility in the case of the fasteners) to accommodate the out-of-plane motion of the proof mass quartet in the x-axis or y-axis secondary oscillation modes while the detection masses 731-734 remain within the xy-plane. The z-axis secondary mode measurements will therefore not be easily disturbed by the proof mass movement which may arise in simultaneously occurring x- and/or y-axis secondary oscillation. It is also easier to design sense transducers around the detection masses when they only undergo motion along one axis in the xy-plane.

Capacitive sense transducers may be implemented either within openings in one or more detection masses, or adjacent to one or more detection masses, to detect the radial z-axis secondary oscillation mode Illustrated in FIG. 7b.

Figure 7C:
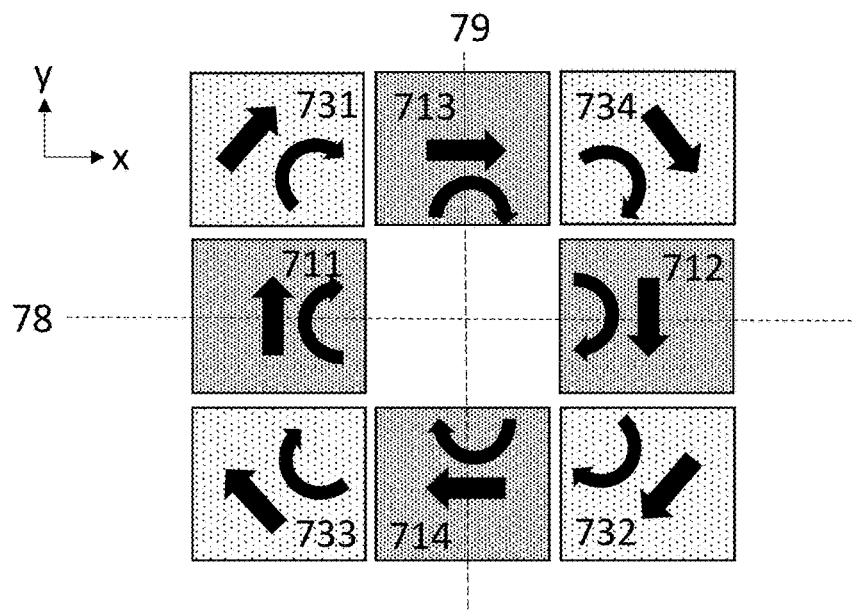

Detection masses 731-734 may also be utilized to detect the second z-axis secondary oscillation mode. This detection is again facilitated by the corner springs 75 and 76. FIG. 7c illustrates one phase in the second z-axis secondary oscillation mode which arises when the second primary oscillation mode illustrated in FIG. 2e is used. Proof masses 711-714 oscillate in the same tangential direction. This tangential oscillation will also set the detection masses 731-734 in tangential oscillation via corner springs 75 and 76.

Figure 7D:
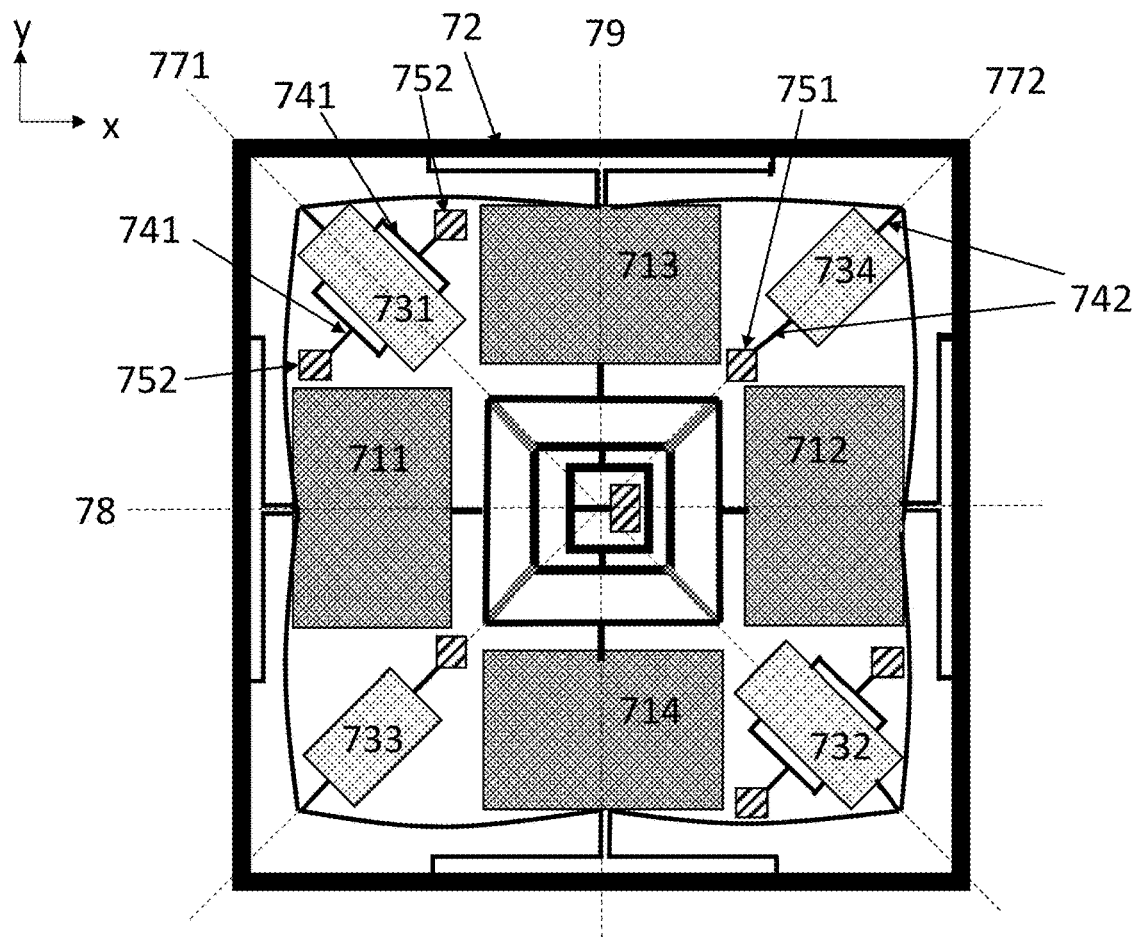

The tangential oscillation of the detection masses may be a combination of linear and rotational motion, as FIG. 7c Illustrates. The suspension of the detection masses will determine how strong the rotational component is. FIG. 7d illustrates two different suspension arrangements for detection masses when they will be moving in the second z-axis secondary oscillation mode shown in FIG. 7c.

Detection masses 731 and 732 are suspended primarily for linear motion between two tangential anchor points 752 by first suspension springs 741 which exhibit flexibility in the linear direction between the tangential anchor points 752. Detection masses 733 and 734, on the other hand, are suspended for both linear and rotational motion by second suspension springs 742 which allow some extent of turning about a vertical axis. These two different suspension arrangements for the detection masses are for illustrative purposes shown in FIG. 7d, but the suspension would typically be the same for each detection mass in a real device.

Again, all corner springs have radial flexibility but are much stiffer in the tangential direction, so the second primary oscillation mode of the proof mass quartet 711-714 will not set detection masses 731-734 in motion. As in the previous example relating to the first primary oscillation mode, detection masses 731-734 will remain substantially stationary until the gyroscope undergoes rotation about the z-axis. The detection masses may also be disconnected from the synchronization frame 72 when the second primary oscillation mode is used, so that their movement is restricted only to the xy-plane.

FIG. 7d also illustrates an alternative central suspension arrangement which comprises a gimbal structure with only one inner torsion bar.

Sense transducers may be connected to all four detection masses 731-734, and a z-axis sense signal may be produced from the combined output of these sense transducers. The readout may be performed differentially so that the signals measured from masses 731 and 732 is subtracted from the signals measured from masses 733 and 734, or vice versa.

However, it is also possible to connect sense transducers to only two detection masses, for example 731 and 734, and to produce a sense signal from these sense transducers either by summation or differentially. In this case, the remaining detection masses can be used for example for Implementing force-feedback in the z-axis or frequency adjustments in the secondary oscillation mode. The corner springs will then distribute this feedback and/or adjustment to all four detection masses.

Figure 8:
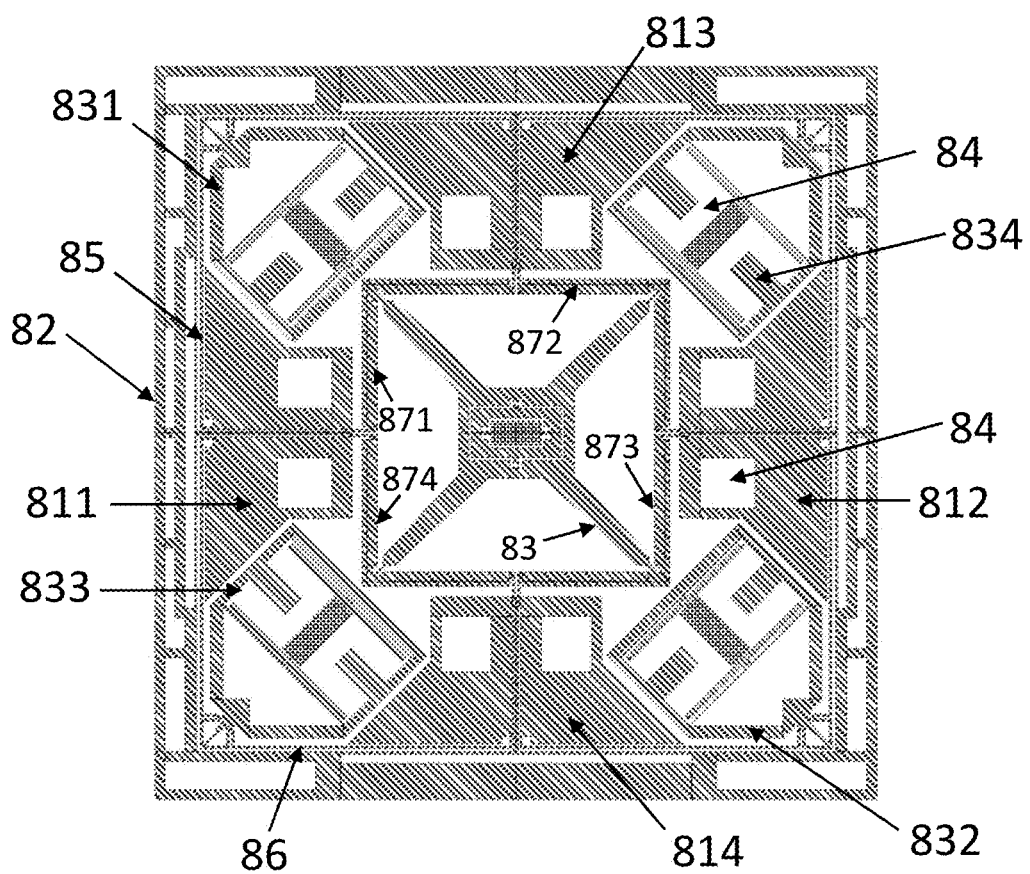
FIG. 8 illustrates a more detailed gyroscope structure.

FIG. 8 illustrates a more detailed gyroscope structure where reference numbers 811-814, 831-834, 85 and 86 correspond to reference numbers 711-714, 731-734, 75 and 76, respectively, in FIGS. 7a and 7b. Reference numbers 83 and 871-874 correspond to reference numbers 43 and 471-474 in FIGS. 4b and 4c. FIG. 8 also illustrates openings 84 in both the proof masses and the detection masses, where drive and/or sense transducers may be placed. Openings in the central suspension arrangement may also be used for this purpose. Drive transducers may for example be placed between the corner elements 871-874 and the gimbal frame.

The invention claimed is:

1. A microelectromechanical gyroscope comprising:
first, second, third and fourth proof masses which form a proof mass quartet, wherein each of said proof masses are in respective rest positions symmetrically arranged around a gyroscope center point where a lateral axis crosses a transversal axis orthogonally in a device plane, and a vertical axis crosses both the lateral axis and the transversal axis orthogonally,
wherein the first and second proof masses are aligned on the lateral axis in the rest position, and the third and fourth proof masses are aligned on the transversal axis in the rest position, and the gyroscope comprises a central anchor point located at the gyroscope center point,
wherein the gyroscope further comprises one or more drive transducers for setting the proof mass quartet into a primary oscillation mode, and one or more sense transducers for detecting oscillation of the proof mass quartet in a z-axis, an x-axis and/or a y-axis secondary oscillating mode induced by the Coriolis force when the gyroscope undergoes angular rotation about the vertical, lateral, and/or transversal axes, respectively,
wherein the gyroscope further comprises a central suspension arrangement for suspending the proof mass quartet from the central anchor point, and the central suspension arrangement is centred around the gyroscope center point and located closer to the gyroscope center point than the proof mass quartet, and each proof mass in the proof mass quartet is attached to the central suspension arrangement, and the central suspension arrangement flexibly accommodates the primary oscillation mode, the z-axis secondary mode and the x-axis and y-axis secondary modes,
wherein the gyroscope further comprises a synchronization frame which is centred around a quartet center point and located further away from the gyroscope center point than the proof mass quartet, and each proof mass in the proof mass quartet is attached to the synchronization frame with one or more frame suspension springs, and the synchronization frame synchronizes at least the x-axis secondary oscillation mode, and the synchronization frame synchronizes at least the y-axis secondary oscillation mode,
wherein the gyroscope comprises first, second, third and fourth detection masses which together form a detection mass quartet, and when the detection mass quartet is in a rest position, it is arranged symmetrically around the gyroscope center point,
wherein the first and second detection masses are aligned on a first diagonal axis which crosses the lateral axis and the transversal axis at an angle of 45 degrees and crosses the gyroscope center point, and the third and fourth detection masses are aligned on a second diagonal axis which is orthogonal to the first diagonal axis and crosses the gyroscope center point, and
wherein one or more lateral corner springs extend to each detection mass from the laterally adjacent proof mass, and one or more transversal corner springs extend to each detection mass from the transversally adjacent proof mass, and the one or more lateral corner springs are stiff in a lateral direction and flexible in a transversal direction, and the one or more transversal corner springs are stiff in the transversal direction and flexible in the lateral direction.

2. The microelectromechanical gyroscope according to claim 1, wherein the synchronization frame comprises four orthogonal corner elements connected in series, and the four orthogonal corner elements form a substantially rectangular shape when the four orthogonal corner elements are in their rest positions, wherein two ends of each corner element are attached to ends of the two adjacent corner elements with a hinge element which allows in-plane rotation of the attached corner elements with respect to each other.

3. The microelectromechanical gyroscope according to claim 1, wherein the gyroscope comprises a peripheral suspension arrangement which comprises a peripheral gimbal structure connected to two peripheral anchor points aligned either on the lateral axis or the transversal axis, and that the synchronization frame is an inner synchronization frame, and the gyroscope further comprises an outer synchronization frame, and the peripheral gimbal structure comprises two lateral torsion bars aligned on the lateral axis to facilitate gimbal rotation about the lateral axis and two transversal torsion bars aligned on the transversal axis to facilitate gimbal rotation about the transversal axis, wherein the two torsion bars which are aligned on the same axis as the peripheral anchor points extend from opposite sides of the outer synchronization frame to the corresponding peripheral anchor points, and the two torsion bars which are not aligned on the same axis as the peripheral anchor points extend from opposite sides of the inner synchronization frame to the outer synchronization frame.

4. The microelectromechanical gyroscope according to claim 1, wherein the central suspension arrangement comprises a central gimbal structure connected to the central anchor point, and the central gimbal structure comprises an inner gimbal frame and an outer gimbal frame, one or more inner torsion bars and two outer torsion bars, wherein the inner torsion bars extend in opposite directions from the central anchor point to the inner gimbal frame, and the outer torsion bars extend from opposite sides of the inner gimbal frame to the outer gimbal frame in a direction which is orthogonal to the inner torsion bars.

5. The microelectromechanical gyroscope according to claim 4, wherein the central suspension arrangement further comprises four orthogonal corner elements connected in series which surround the outer gimbal frame, wherein when in the rest positions, the corner elements form a substantially rectangular shape, and two ends of each corner element are attached to ends of the two adjacent corner elements with a hinge element which allows in-plane rotation of the attached corner elements with respect to each other, and the central suspension arrangement further comprises at least four connection bars, wherein each connection bar extends from the outer gimbal frame to corner point of the adjacent corner element, and each proof mass in the proof mass quartet is attached to the adjacent hinge element.

* * * * *